United States Patent [19]

Suda et al.

[11] Patent Number: 5,260,939

[45] Date of Patent: Nov. 9, 1993

[54] SPEECH TRANSMISSION METHOD USING SPEECH FRAME INTERPOLATION

[75] Inventors: Hirohito Suda, Yokosuka; Kazunaga Ikeda, Yokohama, both of Japan

[73] Assignee: Nippon Telegraph and Telephone Corporation, Tokyo, Japan

[21] Appl. No.: 871,225

[22] Filed: Apr. 20, 1992

[30] Foreign Application Priority Data

Apr. 22, 1991 [JP] Japan .................................. 3-116682

[51] Int. Cl.⁵ .............................................. H04J 3/00
[52] U.S. Cl. ...................................... 370/77; 370/81; 371/31
[58] Field of Search ................ 370/77, 95.3, 119, 112, 370/81; 371/2.1, 31; 455/52.1, 63; 381/31, 46; 375/34

[56] References Cited

U.S. PATENT DOCUMENTS

| | | | |
|---|---|---|---|
| 4,215,335 | 7/1980 | Doi et al. | 371/2.1 |
| 4,750,167 | 6/1988 | Meyer | 370/77 |
| 4,901,319 | 2/1990 | Ross | 371/2.1 |
| 5,020,056 | 5/1991 | Chennakeshu | 370/95.3 |

Primary Examiner—Douglas W. Olms
Assistant Examiner—Hassan Kizou
Attorney, Agent, or Firm—Pollock, VandeSande and Priddy

[57] ABSTRACT

A speech transmission method utilizes a speech frame length having a time period within which a speech waveform remains substantially steady-state, and the speech frame length is selected to be 1/M the time period of one TDM or TDMA frame. For each speech frame, speech signal is coded, from which are selected M different speech codes including two speech codes that are spaced one or more speech frames apart, and the selected M speech codes are combined into composite codes. Each composite code is inserted in one time slot of each TDM or TDMA frame.

12 Claims, 11 Drawing Sheets

SPEECH TRANSMISSION METHOD USING SPEECH FRAME INTERPOLATION

BACKGROUND OF THE INVENTION

The present invention relates to a speech transmission method which is applied to, for example, a mobile radio communication system in which channel errors occur frequently.

With a speech transmission method for use in a mobile radio communication system of the type wherein channel errors occur frequently, an error correction coding technique is used to suppress the deterioration of transmitted speech quality which is caused by the channel errors. In a mobile radio communication system of the type wherein burst errors occur frequently, however, the deterioration of speech quality cannot sufficiently be suppressed at present even by powerful error correcting codes. The reason for this is that the density of errors in a burst is so high that it is difficult to completely remove the errors even if powerful error correcting codes are used. On this account, the situation quite often arises where not all errors are corrected even by the use of the error correction coding technique.

A speech, if decoded from coded information containing errors left uncorrected, will seriously be distorted. To suppress the distortion, it is conventional to utilize a system configuration in which a decoder is equipped with an error detecting function and when an error is detected in the code after error correction processing, the code is subjected to processing different from an ordinary decoding process, that is, waveform recovering of missing speech segments (which process will hereinafter be referred to as interpolation) to thereby suppress the influence of the channel error.

Referring now to FIG. 1, the effect of interpolation will be described. In FIG. 1 the abscissa represents time and Row A shows partitioning of an input speech signal into speech coding frames (hereinafter referred to as speech frames) and Row B an original speech signal waveform. Row C shows a speech signal waveform decoded when a channel error remained uncorrected in the speech code of an ith speech frame, and in this case the decoded waveform of the ith speech frame is unnatural. Row D shows a speech signal waveform decoded using the above-mentioned interpolation for the channel error left uncorrected; in this instance, the decoded speech signal waveform of the ith speech frame is closer to the original speech signal waveform.

The interpolation processing mentioned herein is to decode the speech waveform signal by continuously repeating a periodic portion of the immediately preceding speech frame. With the use of such interpolation processing, it is possible to suppress the distortion of the decoded waveform which is caused by channel errors. In conventional speech code transmission systems, however, no particular consideration has been given to the implementation of an efficient interpolation method.

A conventional speech code transmission system will be described below as being applied to a 6-channel TDM (Time Division Multiplexing) transmission system shown in FIG. 2. In FIG. 2 input speech signals Sa to Sf are respectively subjected to speech/channel coding by speech/channel coding units 11a to 11f for each speech frame and then TDM multiplexed by a TDM multiplexer 12 for transmission. At the receiving end the multiplexed code sequence is TDM demultiplexed by a TDM demultiplexer 13 and the demultiplexed codes are respectively decoded by speech/channel decoding units 14a to 14f into decoded speech waveforms Sa' to Sf'. In FIG. 3 there are shown more in detail the relationships between speech coding, channel coding and TDM multiplexing in conjunction with only the speech signal Sa in the interests of brevity.

In FIG. 3, Row A shown partitioning of the input speech signal waveform Sa into speech frames 1, 2, . . . . The speech signal is coded for each speech frame of a length equal to one TDM period (which is L sec and is called a TDM frame as well) to obtain speech codes F11, F12, F13, . . . depicted on Row B. Incidentally, numerals in rectangular boxes represent corresponding input speech frame numbers. As such speech coding methods wherein the speech signal is divided or partitioned into fixed frames and coded into a fixed number of bits for each frame, there have been several methods such as CELP (Code Excited Linear Predictive) coding, LD-CELP (Low Delay CELP) coding, TC-WVQ (Transform Coding With Weighted Vector Quantization) and VSELP (Vector Sum Excited Linear Predictive) coding. The present invention can be used with those conventional systems as long as the speech signal is partitioned at regular time intervals and then coded into a fixed number of bits for each frame.

The speech codes are subjected to error correction/detection coding (hereinafter referred to as channel coding) to provide a code train or channel codes F21, F22, F23, . . . shown on Row C. Compared with the speech codes F11, F12, . . . , the channel codes F21, F22, . . . each have its number of bits increased corresponding to redundancy bits of the error correction/detection code. As shown on Row D, the channel codes F21, F22, . . . are each inserted in, for example, a time slot #1 in each TDM frame and TDM multiplexed with channel codes in other time slots, thereafter being transmitted. At the receiving end the speech/channel decoding unit 14a, which is to receive the speech signal Sa, decodes the TDM demultiplexed channel code of each time slot #1 to obtain the decoded speech signal Sa' of one speech frame length shown on Row E.

Now, let it be assumed that a channel error caused in the channel code F22 corresponding to the second speech frame could not have been corrected at the receiving end even by an error correction code. In this instance, it is necessary to interpolate the erroneous speech code or speech waveform with the error-free speech code F12 in the second speech frame or its decoded speech waveform. The length of the speech frame to be interpolated is L sec, which is equal to the TDM period (i.e. the time length from the time slot #1 tO #6). On this account, in the method depicted in FIG. 3 the TDM period is predetermined, and when it is long, the interpolation period L sec also increases. In general, the speech waveform in conversations can be regarded as substantially steady-state when the speech frame length is 20 to 50 ms or so, but when the speech frame is longer, the speech waveform is considered to undergo variations. Thus, when the speech frame length L is in excess of 50 ms, the speech frame containing a channel error cannot always be decoded into a speech of good quality, even if it is interpolated with the immediately preceding frame.

N. JAYANT et al. have proposes a DPCM packet transmission method wherein a series of quantize error samples of each speech frame are arranged into an oddsample group and an even-sample group and are transmitted with two adjacent packets, and if one of the packets is lost due to a channel error, a required number of samples are derived from the samples of the other packet by means of interpolation (IEEE, TRANS. ON COMM., VOL.COM-29, NO. 2, FEB. 1981, pp. 101-109). This method is defective in that since peaks of samples are flattened by interpolation, a speech decoded from the interpolated samples will be distorted.

In the case where a certain speech frame needs to be interpolated at the receiving end because a channel error still remains in the speech code decoded from the channel code corresponding to the speech frame, if the speech frame can be interpolated using speech waveform information following, in time sequence, the speech frame as well as speech waveform information preceding it in time sequence, then the decoded speech of such an interpolated speech frame will be less distorted. In the case of interpolating a certain speech frame, however, waveform information of the next speech frame is needed in advance, and accordingly the required transmission delay time will increase by the waiting time therefor. In such a duplex communication system as the telephone the reduction of the transmission delay time is required because an increase of the transmission delay time in both parties' speeches will hinder their conversation.

Moreover, in the case where channel errors are left uncorrected over several speech frames before and after the speech frame to be interpolated, information of the preceding and following speech frames necessary for the interpolation are lost, and consequently, it is difficult to obtain an interpolated speech of good quality. Therefore, it is desirable to keep low the interpolation probability (the probability of channel errors remaining uncorrected) of speech frames before and after the speech frame to be interpolated.

SUMMARY OF THE INVENTION

It is therefore an object of the present invention to provide a speech transmission method which provides for large probability in the interpolation of the speech frame that needs to be interpolated because of a channel error left uncorrected therein and which suppresses deterioration of the decoded speech quality by interpolation.

According to the present invention, in a speech transmission method wherein a speech signal is divided into speech frames and a speech code into which the speech waveform of each speech frame is coded is packed into a time slot of a multiplex channel of the TDM or TDMA technique, the speech signal is divided into frames each having a length 1/M (M being an integer equal to or greater than 2) of multiplex transmission period so that the time length of the speech frame is within a range of 0.6-50 ms, and speech codes of M speech frames containing those spaced at least one speech frame apart are combined and then inserted in the same transmission slot.

Thus, by making the speech frame length shorter than the TDM or TDMA period, it is possible to insert speech frame information of a plurality of frames into one time slot of the TDM or TDMA transmission. In addition, since the length of the speech frame is selected to be within or shorter than a range in which the speech waveform may become steady-state, it is possible to suppress deterioration of the speech quality which is caused by interpolation of the speech frame containing a channel error.

Moreover, since the transmission of a plurality of discontinuous order of speech frames in the same time slot is equivalent to the multiplexed transmission of speech codes of adjacent (or continuous) order of speech frames in different time slots, it is possible to keep low the probability of interpolation of speech frames before and after that which needs to be interpolated because of a channel error left uncorrected in its speech code—this increases the probability that the interpolation of the speech frame containing the channel can be interpolated.

Besides, in the case where when speech talkspurt starting is detected during speech coding, the foremost one of a plurality of speech frames to be inserted into the TDM slot immediately thereafter is replaced with talkspurt starting information prior to transmission, it is possible to initiate speech decoding at the receiving end without incurrence of missing of talkspurt starting.

DESCRIPTION OF THE PREFERRED EMBODIMENTS

Embodiment 1

Figure 1:
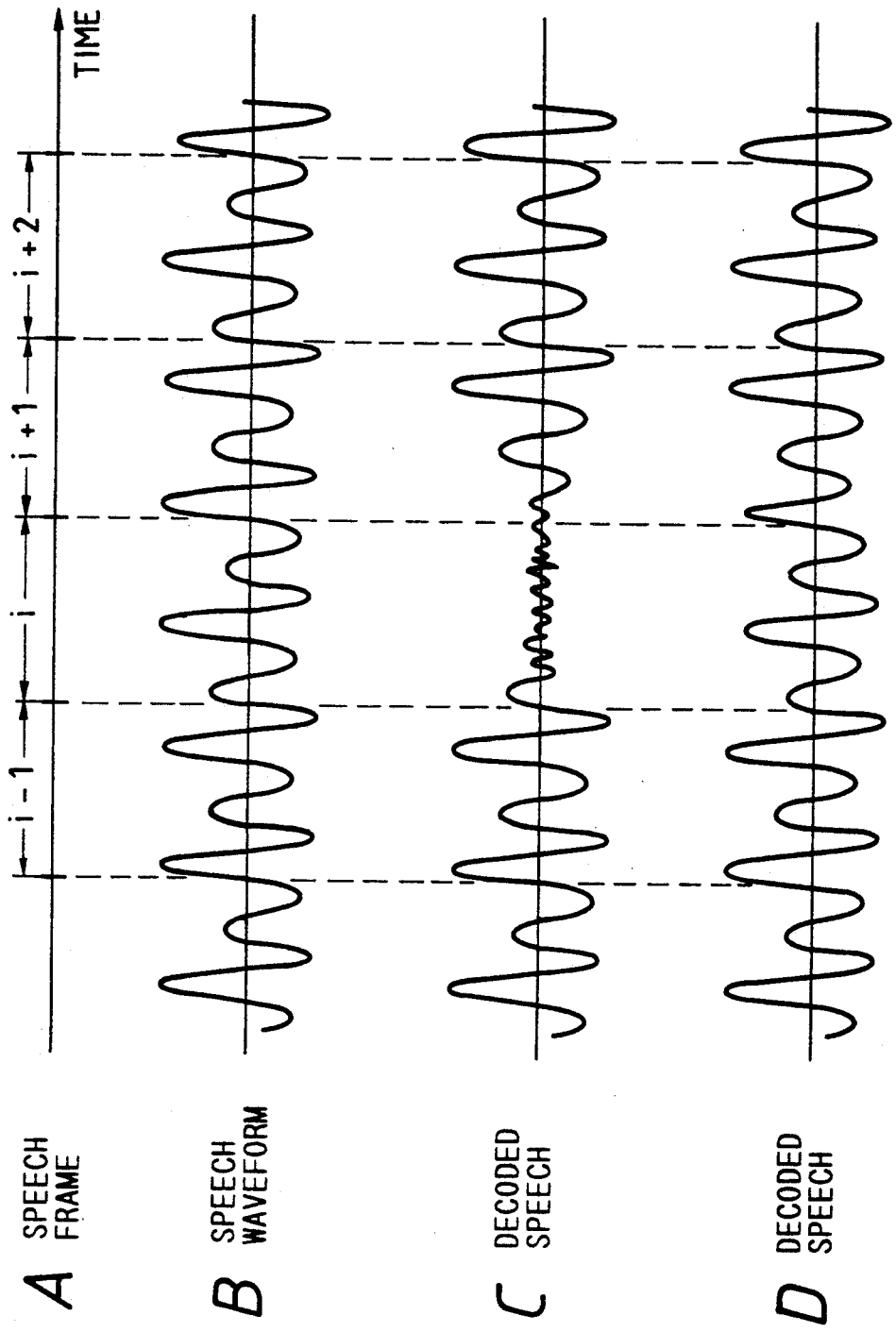
FIG. 1 is a waveform diagram for explaining interpolation.
Figure 2:
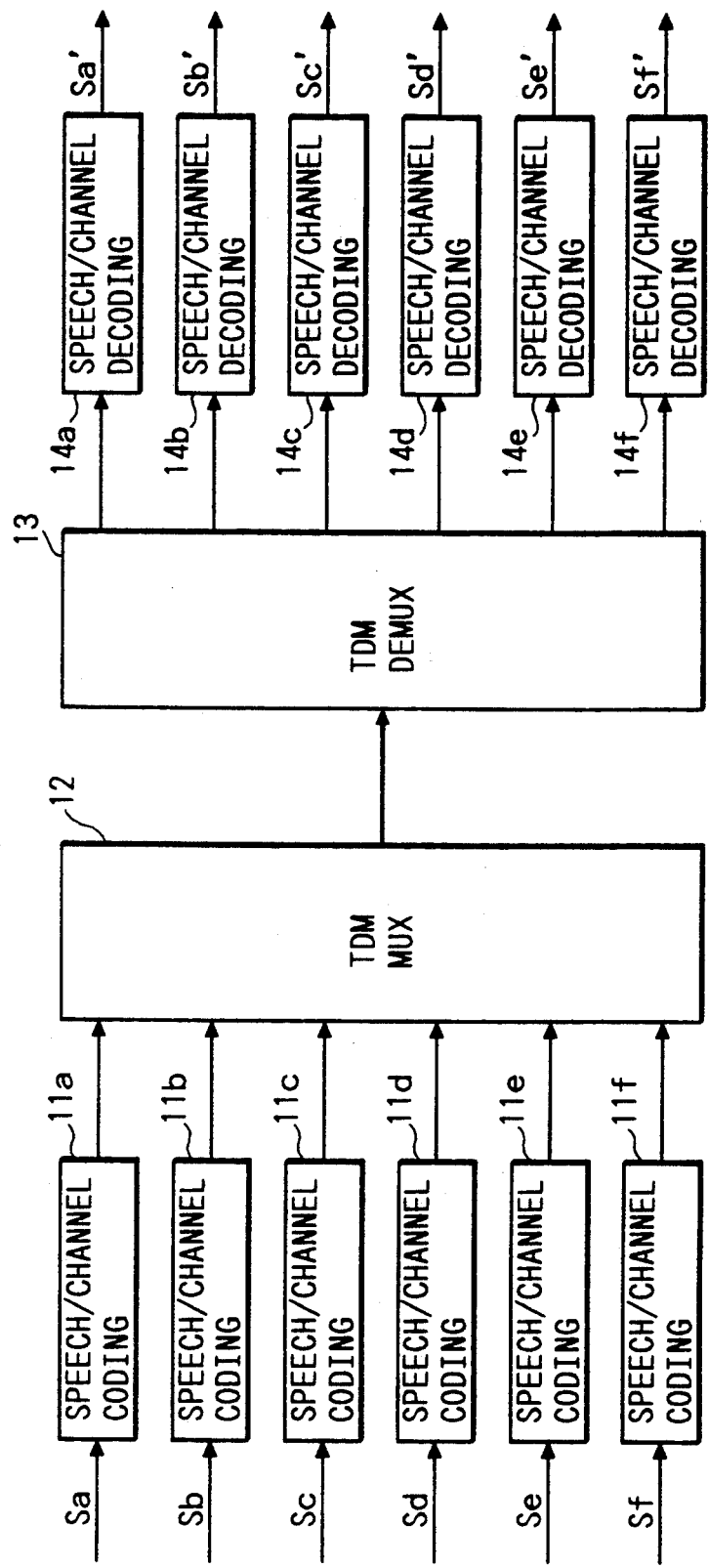
FIG. 2 is a block diagram showing a conventional TDM transmission system.
Figure 3:
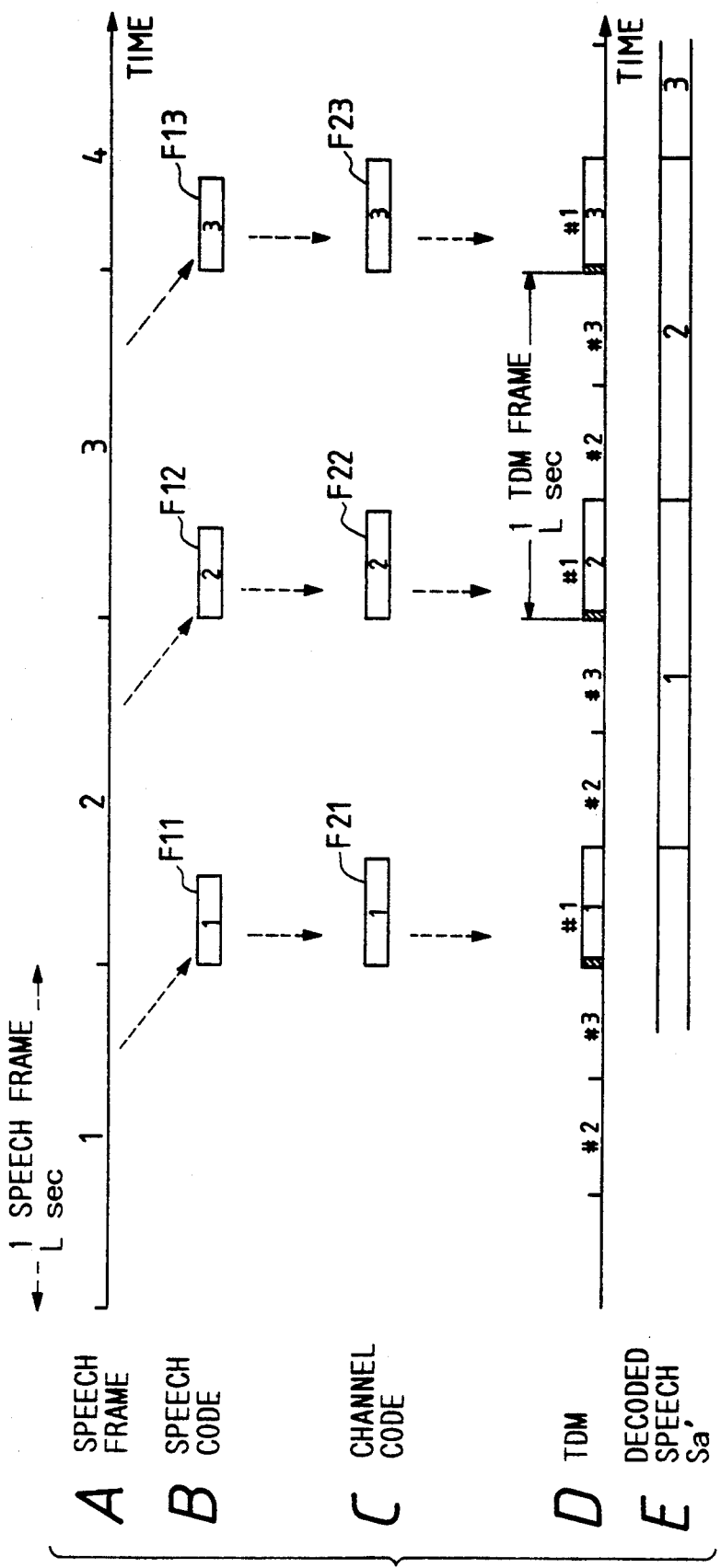
FIG. 3 is a timing chart showing the procedure of the conventional TDM transmission system.
Figures 4, 5:
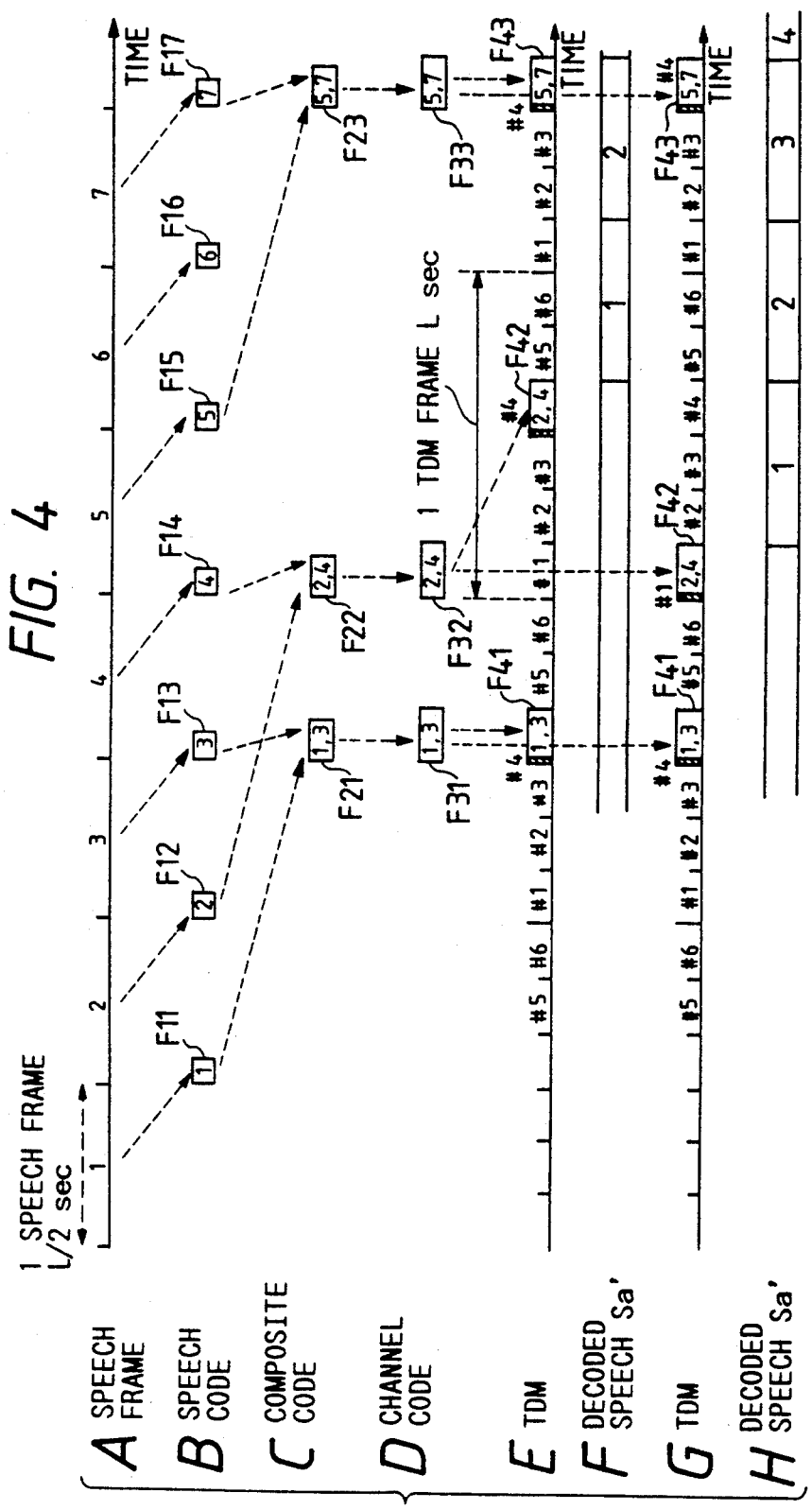
FIG. 4 is a timing chart showing the procedure for speech transmission according to the present invention.
FIG. 5 is a timing chart showing, by way of example, assignment of speech signals to TDM time slots.

FIG. 4 is a timing chart for explaining a first embodiment of the speech transmission method of the present invention applied to the TDM system depicted in FIG. 2. In FIG. 4 there is shown signal processing by which a speech code sequence of only the speech signal Sa is multiplexed into TDM frames, in the interests of clarity.

In FIG. 4, Row A shows partitioning of an input speech or the speech signal Sa into speech frames, numerals (1–7) in the respective frames representing speech frame order numbers. The speech waveforms of the respective speech frames are sequentially coded by the speech coding technique, and consequently, speech codes F11, F12, F13, ... shown on Row B are provided every L/2 sec one after another. In this example the speech frame length is a half of one TDM frame period of L sec and one speech frame length (L/2) is selected in the range of about 20 to about 50 ms at which the speech waveform keeps its steady state or is shorter than that range. In speech coding systems in which a speech is partitioned into speech frames of a fixed period and each frame is coded with a fixed number of bits and to which the present invention is applied, such as CELP, LD-CELP, TC-WVQ, VSELP and vocoder utilizing phase equalization, there is included processing of vector quantization of at least five successive waveform samples, and if the sampling frequency in speech coding is 8 kHz as usual, then it is necessary, for the vector quantization, that the speech frames be at least around 0.6 ms long.

When the speech code F13 of the third speech frame is obtained, it is combined with the already provided speech code F11 of the first speech frame into a composite code F21 shown on Row C. Next, when the speech code F14 of the fourth speech frame is obtained, it is combined with the already provided speech code F12 of the second speech frame into a composite code F22. Thereafter two speech codes of each pair of alternate speech frames are similarly combined into a composite code. That is, in this embodiment processing of combining speech codes of (4n−3)th and (4n−1)th speech frames into a composite code and processing of combining speech codes of (4n−2)th and (4n)th speech frames into a composite code are performed in connection with n=1, 2, ..., whereby the composite codes F21, F22, F23. ... are created one after another.

The composite codes F21, F22, F23, ... are subjected to error correction/detection coding by adding redundancy bits to their specific information bits, whereby channel codes F31, F32, F33, ... are produced as shown on Row D.

Next, a sync bit necessary for TDM transmission is added to the beginning of each of the channel codes F31, F32, F33, ... as indicated by hatching on Row E or G, providing channel codes F41, F42, .... The channel codes F41, F42, ... thus produced are each inserted in one time slot of the corresponding TDM frame and sent out. In this case, there are two method of assigning the channel codes to the time slots of the TDM frames: one is to assign the channel codes to time slots of the same order numbers at all times as shown on Row E, and the other is to assign the channel codes to time slots of two different order numbers which are alternately switched every TDM frame as shown on Row G. In the case of the latter depicted on Row G, first and fourth time slots are alternately switched every TDM frame. In other words, when one TDM frame is composed of 2K (where K is a positive integer) time slots, the first and (K+1)th time slots, which are alternately switched every TDM frame, are assigned to the speech signal Sa. This can be achieved simply by sequentially assigning the channel codes F31, F32, ... to time slots immediately after they were produced, or to time slots a certain fixed number of time slots thereafter. The assigning of the channel codes corresponding to the other speech signals Sb, Sc, ... to the TDM time slots can be done by shifting the first and fourth time slot positions for the channel codes of the speech signal Sa by one time slot as shown in FIG. 5. That is, channel codes of the speech signal Sb are transmitted using TDM time slots #6 and #3 alternately every TDM frame; channel codes of the speech signal Sc are transmitted using time slots #5 and #2 alternately every TDM frame; channel codes of the speech signal Sd are transmitted using time slots #4 and #1 alternately every TDM frame; channel codes of the speech signal Se transmitted using time slots #3 and #6 alternately every TDM frame; and channel codes of the speech signal Sf are transmitted using time slots #2 and #5 alternately every TDM frame.

Now, assume that the channel code F42 in the TDM multiplexed sequence shown on Row E or G in FIG. 4 contains a channel error uncorrectable even by an error correcting code but that the other channel codes can be received correctly. In this instance, if the channel error is left uncorrected, then the speech waveforms of the second and fourth speech frames cannot be decoded. Yet, the speech waveform of the second speech frame can be determined by interpolation based on the speech codes F11 and F13 of the first and third speech frames contained in the channel codes F41 shown on Rows E and G or based on speech waveforms decoded from the above-said speech codes. Similarly, the speech waveform of the fourth speech frame can be determined by interpolation based on the speech codes F13 and F15 of the third and fifth speech frames contained in the channel codes F41 and F43 or based on speech waveforms decoded from these speech codes. In either case, the speech signal which is L/2 sec long is interpolated. Since the speech frame length (L/2 sec) is selected such that the speech waveform remains substantially steady-state for this period of time, and since the speech frames contiguous to the erroneous one are very likely to be decoded correctly, deterioration of the decode speech quality by the interpolation of the erroneous speech frame with adjoining ones is very slight.

As described above, in the embodiment of FIG. 4 speech codes spaced one speech frame apart are combined and inserted in a predetermined time slot in each TDM frame for transmission, so that even if a channel error occurs, it is not very likely that both the speech codes of the contiguous or successive speech frames cannot be decoded. Hence, even if an error occurs in the decoding of a certain speech frame, the erroneous speech frame can be interpolated using speech frames preceding and following it as mentioned above. In contrast thereto, for example, in the case where pairs of contiguous speech codes F11 and F12, F13 and F14, F15 and F16, ... on Row B in FIG. 4 are simply combined and inserted as channel codes F41, F42, F43, ... in predetermined time slots in respective TDM frames, if one time slot is lost, codes of two contiguous speech frames will be lost. Hence, interpolation in this case must be conducted using speech codes one speech frame apart from the lost ones and the decoded speech quality is impaired accordingly.

The speech frame lost due to a channel error can be interpolated using only the immediately preceding speech frame (fore-interpolation) or using the immediately preceding and following speech frames (fore- and aft-interpolation). The former makes the decoding timing delay (i.e. the transmission delay) smaller than does the latter but is inferior to the latter in terms of the decoded speech quality. Depending on how to select the decoding timing, there are cases where either one of the fore-interpolation and the fore- and aft-interpolation can be used for all speech frames and where the fore- and aft-interpolation can be used for all speech frames. Rows F and H in FIG. 4 show the cases of the speech decoding timing which permits the fore- and aft-interpolation for all the speech frames; numerals in respective blocks represent decoded speech frame order numbers.

Figure 6:
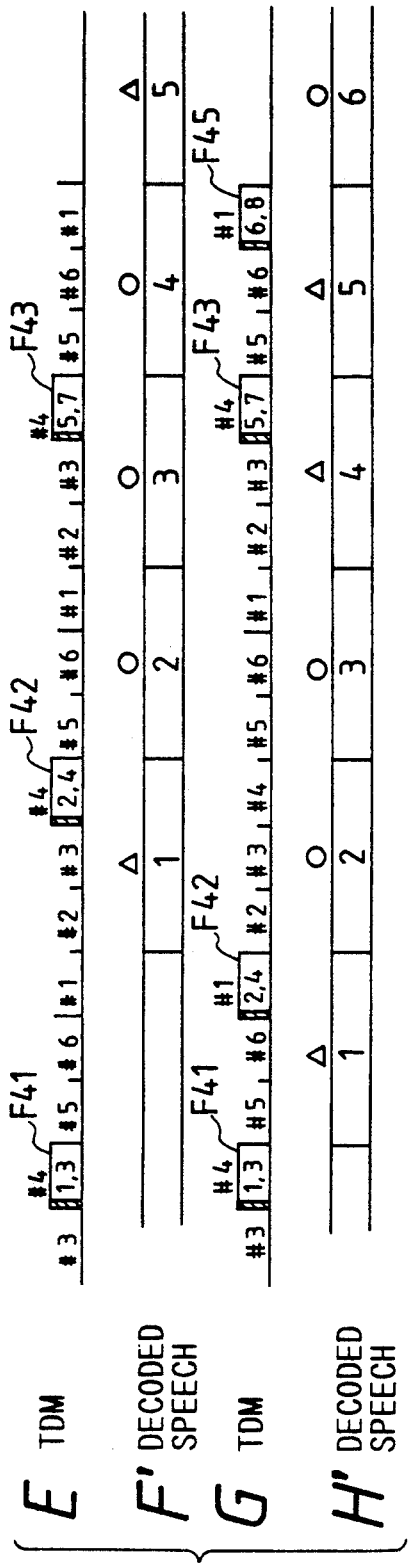
FIG. 6 is a timing chart showing an example of the decoding timing.

Now, assume that the speech decoding timing for the multiplexed sequences shown on Rows E and G in FIG. 4, for example, is advanced by one speech frame as compared with the timing on Rows E and H, as depicted on Rows F' and H' in FIG. 6. In the case of Row F', the fore- and aft-interpolation cannot be used for 1st, 5th, 9th, ... speech frames (those after the fifth one being not shown) marked with triangles and the fore-interpolation must be used. As regards the other speech frames indicated by white circles, the fore- and aft-interpolation can be employed. In the case of Row H', the fore-interpolation must be conducted for 1st, 4th, 5th, 8th, 9th, ... speech frames (the eighth and subsequent frames being not shown) indicated by triangles, but the fore- and aft-interpolation can be used for the other speech frames indicated by white circles. In this way, the combined use of the fore-interpolation and the fore- and aft-interpolation enables the decoding timing to be made faster than the decoding timing on Rows F and H in FIG. 4 by one frame time (L/2 sec). In the examples of FIGS. 4 and 6 the fore-interpolation may also be conducted for the speech frames for which the fore- and aft-interpolation can be used. The interpolation may be done at the level of either the speech code or decoded speech waveform. The simplest method of the fore-interpolation is, for example, to replace the speech frame to be interpolated with a repetition of the speech code or speech waveform of the immediately preceding speech frame. The fore- and aft-interpolation can be done by a method described in, for example, "A study on Speech Interpolation for Digital Mobile Communication" Hosoi et al, 1990 Autumn National Convention Record, A-133, pp1-135. Various other known interpolation techniques can be employed.

Incidentally, the timing on each row in FIG. 4 is based on the assumption that the processing time for each of coding and decoding is zero. The timing in the actual system is delayed more than that in the example of FIG. 4 under restrictions of the processing time for each of coding and decoding and on the system configuration. The same is true of other embodiments which will be described below.

EMBODIMENT 2

Next, a description will be given, with reference to FIG. 7, of another embodiment of the present invention. The embodiment of FIG. 4 has been described in conjunction with the case where speech codes of alternate speech frames, such as first and third, second and fourth, and fifth and seventh speech frames, are combined, but in this embodiment, as shown on Rows A, B, C, D and E in FIG. 7, speech codes spaced two speech frames apart, such as second and fifth, and fourth and seventh, are combined into composite codes, which are transmitted in the same time slot in each TDM frame. With the decoding timing shown on Row F, the fore- and aft-interpolation can be conducted for all the speech frames, but with the decoding timing on Row F', advanced by one speech frame as compared with the timing on Row F, it is necessary to conduct the fore-interpolation for odd-numbered speech frames. The other procedures are the same as those used in Embodiment 1.

EMBODIMENT 3

Figure 7:
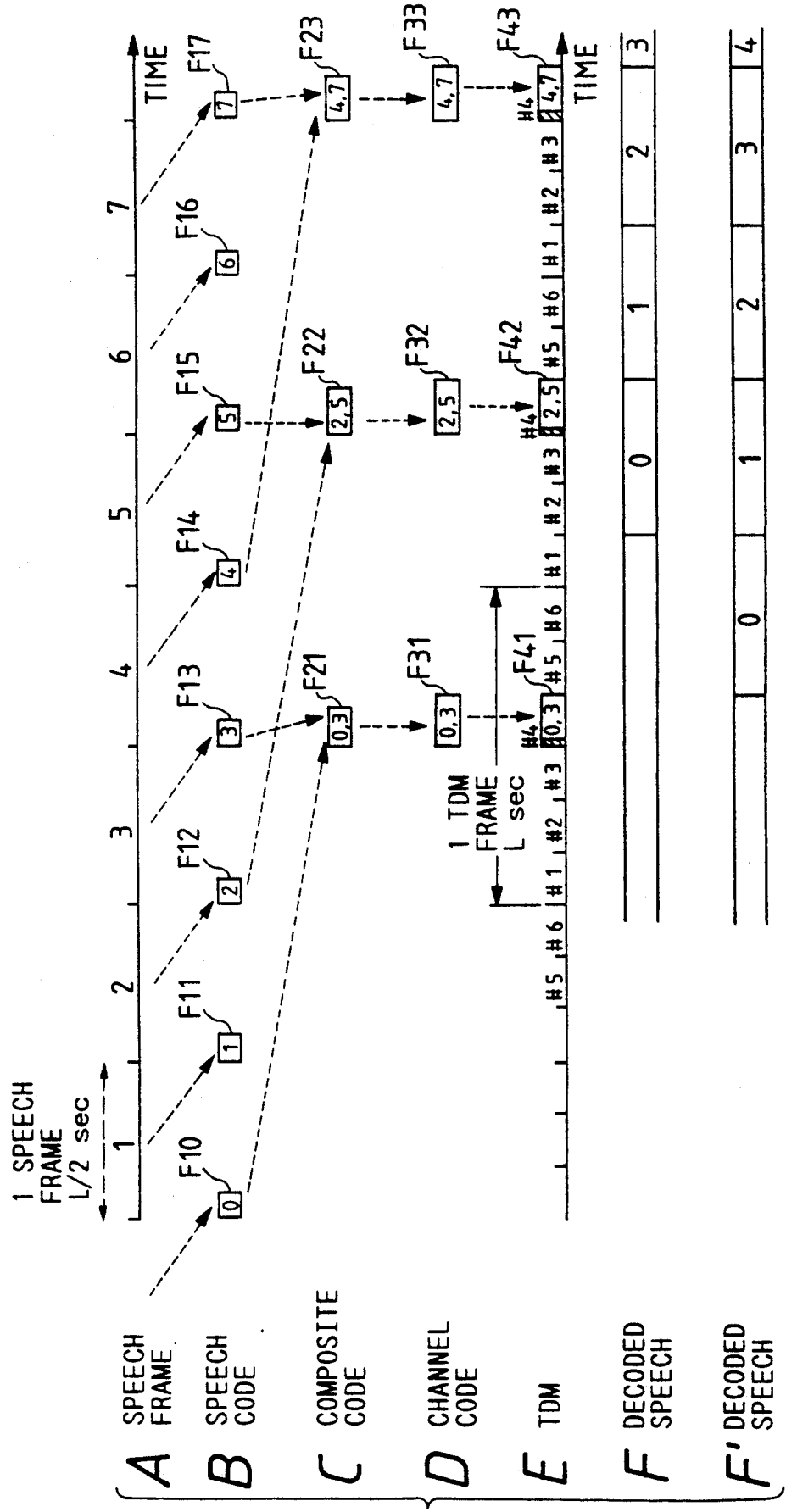
FIG. 7 is a timing chart showing the speech transmission procedure in a second embodiment of the present invention.
Figure 8:
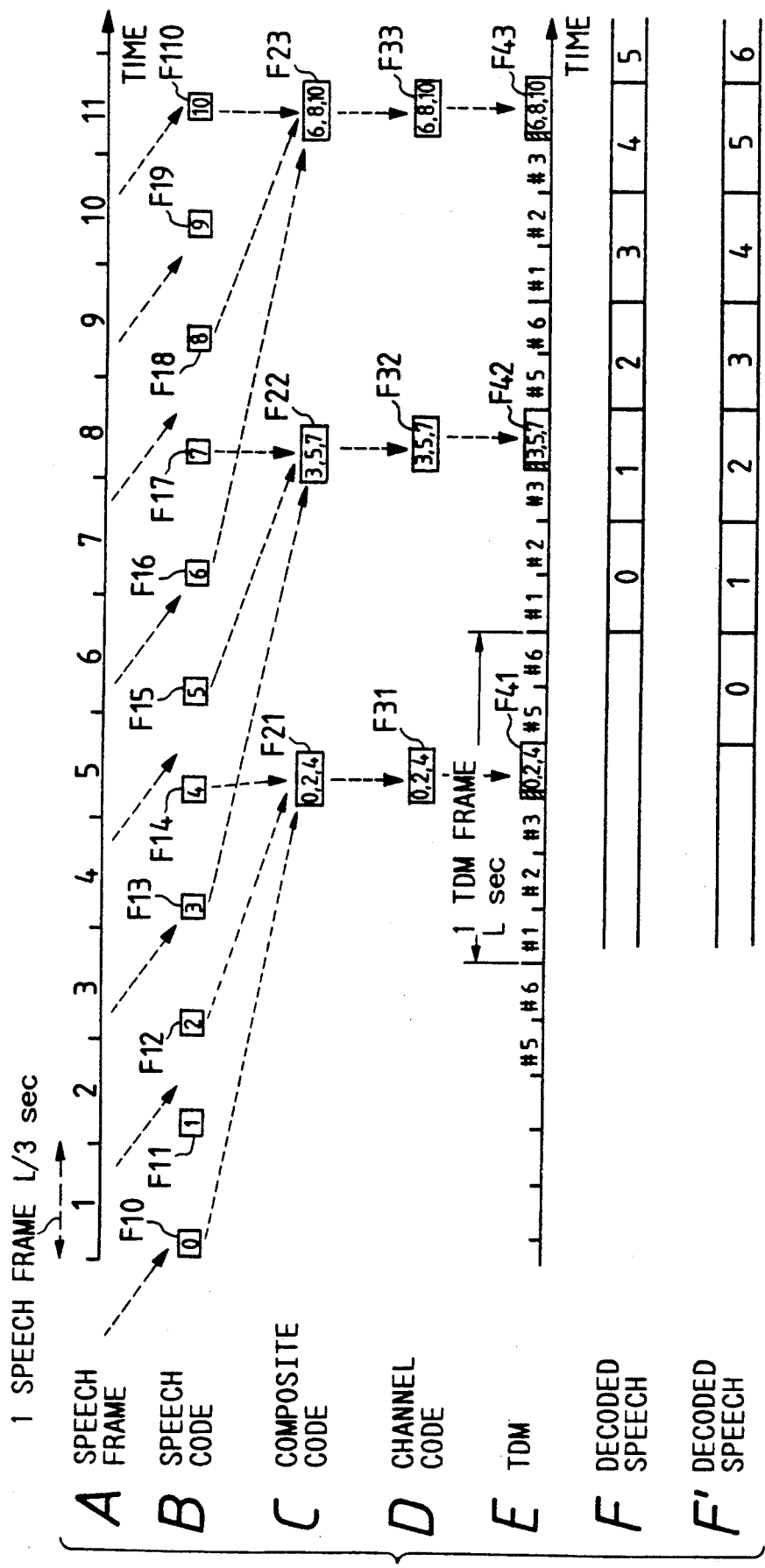
FIG. 8 is a timing chart showing the speech transmission procedure in a third embodiment of the present invention.

In the embodiments of FIGS. 4 and 7, since one TDM frame length (L sec) is twice longer than the speech frame, two speech codes are combined into a composite code which is inserted in one time slot in each TDM frame, but the length of one TDM frame may be three or more times larger than the length of the speech frame. FIG. 8 shows the case where one TDM frame is three time longer than the speech frame. In this case, speech codes F10, F12 and F14 derived from three successive even-numbered speech frames 0, 2 and 4 are combined into a composite code F21 shown on Row C; speech codes F13, F15 and F17 derived from three successive odd-numbered speech frames 3, 5 and 7 are combined into a composite code F22. Thereafter, the combination of speech codes of three successive even-numbered speech frames and the combination of speech codes of three successive odd-numbered speech frames likewise alternate with each other. The subsequent procedure is the same as that used in the embodiment of FIG. 4. Row F shows the decoding timing at which the fore- and aft-interpolation can be performed. The decoding timing shown on Row F' is earlier than the decoding timing on Row F by one speech frame, but the fore-interpolation must be conducted for the speech frames 2, 5, 8, 11, ..., because the fore- and aft-interpolation cannot be performed therefor.

EMBODIMENT 4

Figure 9:
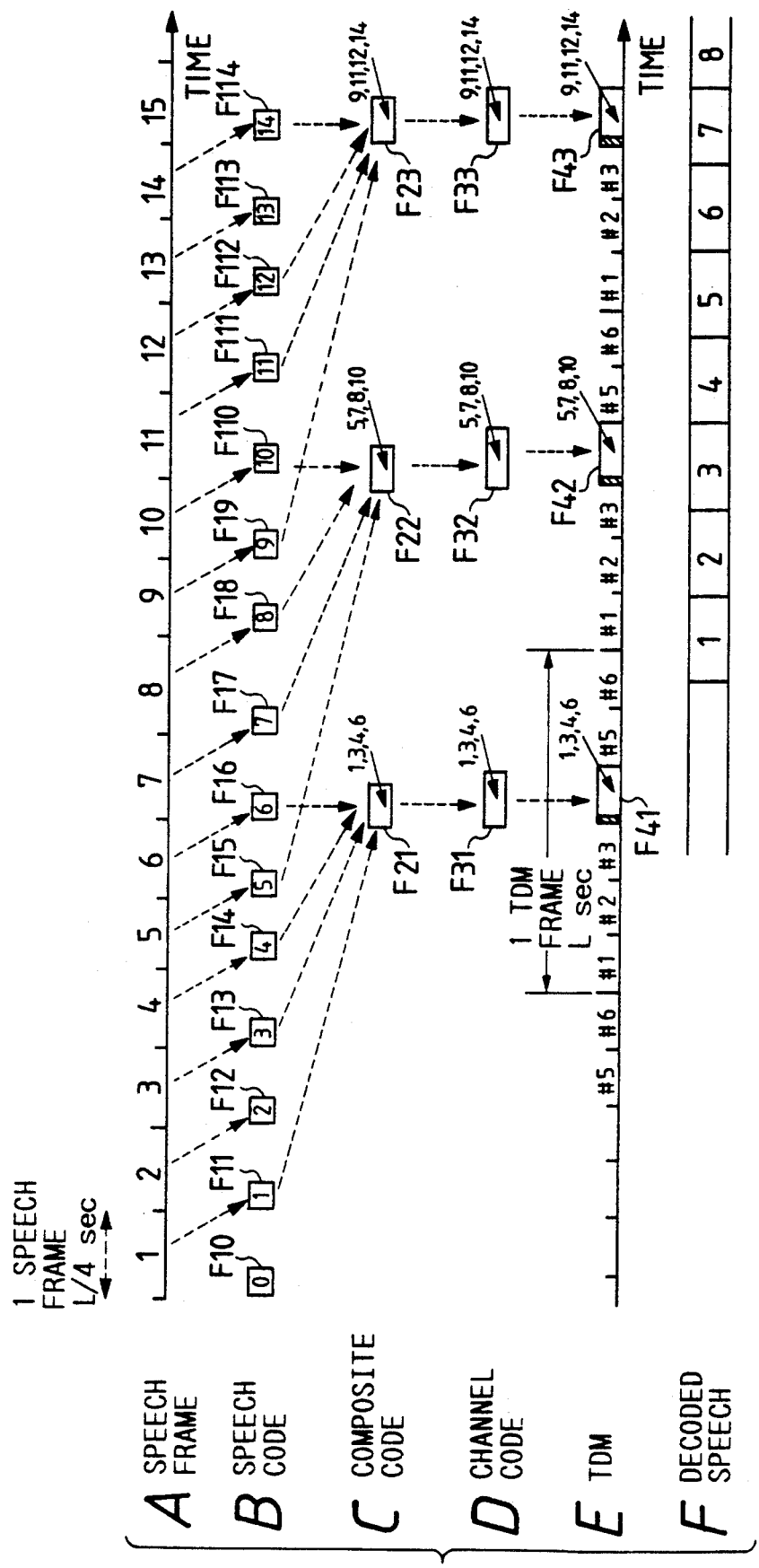
FIG. 9 is a timing chart showing the speech transmission procedure in a fourth embodiment of the present invention.

FIG. 9 shows a timing chart for embodying the speech transmission method of the present invention in the case where one TDM frame length (L sec) is four times the speech frame length (L/4 sec). In this instance, speech codes drived from four speech frames are combined into a composite code, which is inserted in one time slot in the TDM frame. As shown on Row C, in this embodiment the inner two of four speech frames to be combined (seventh and eighth speech frames in the code F22, for example) are of contiguous order and the outer two speech frames (fifth and tenth speech frames in the code F22) are spaced one speech frame apart. The skipped speech frames (sixth and ninth speech frames not in the code F22) are incorporated in the immediately preceding and succeeding composite codes (F21 and F23), respectively. Hence, when one time slot is lost in the TDM multiplexed sequence on Row E, the fore- and aft-interpolation cannot be conducted for the two continuous frames contained in the lost time slot. However, the preceding one of these two lost frames is interpolated using the speech frame immediately preceding it and the result of the interpolation can be used to interpolate the succeeding one of the lost speech frames.

As will be evident from the embodiments of FIGS. 4, 7, 8 and 9, the composite codes F21, F22, F23, ... (Row C), which are produced in the present invention, each have M (where M is an integer equal to or greater than 2) speech codes, and the first two of the M speech codes are spaced one or more speech frames apart. The last two speech codes are spaced one speech frame apart and the intermediate speech frame is contained in the immediately succeeding composite code.

Figure 10:
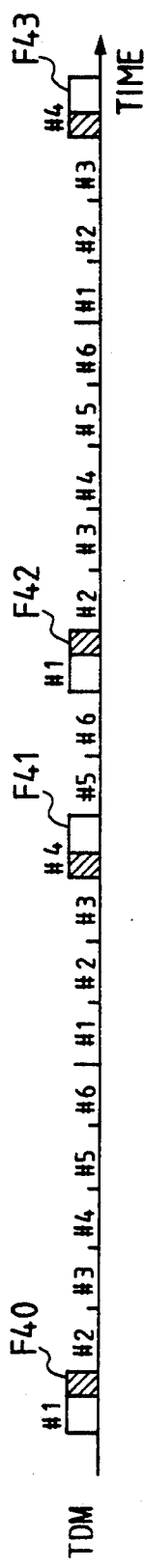
FIG. 10 is a timing chart showing an example of packing information bits in each TDM time slot.

In the processing for creating the channel codes F31, F32, ... shown on each Row D in FIGS. 4, 7, 8 and 9, information bits which are checked for an error in each channel code may be packed so that they gather at the beginning or end of the time slot. FIG. 10 shows an example of such a packing method applied to the TDM multiplexed sequence depicted on Row G in FIG. 4. The hatching in each rectangular block represents the information bits to be checked for an error, and these information bits are packed in the time slots at their head and end alternately every TDM frame. By transmitting, as one lump package, the information bit to be checked for an error, it is possible to increase the probability that a burst error on the channel stays outside the package of the information bits. According to the property of the burst error on the channel, the use of a bit interleave technique will be more effective.

As described above, when the TDM frame is M times longer than the speech frame (where M is an integer equal to or greater than 2), speech codes derived from a total of M speech frames including an arbitrary speech frame and M-1 speech frame of frames spaced one or more speech frames apart from the arbitrary one are combined into a composite code, which is inserted in one time slot in the TDM frame. This is repeated at intervals of M speech frames. By this, even if one time slot is lost by a burst noise on the channel, the speech frame information in the missing time slot can be interpolated using adjoining speech frame information contained in the other time slot. In addition, since the speech frame is selected in or below the range of 20 to 50 ms in which the mean speech waveform remains in its steady state, deterioration of the speech quality by interpolation is slight, and hence a speech transmission of high quality can be achieved.

EMBODIMENT 5

Incidentally, some pieces of radio communication equipment required to be lightweight and compact, such as portable and cordless telephones, employ a VOX (Voice Operated Transmission) system because the battery capacity can be reduced by cutting power consumption. The VOX system is one that stops transmission of electric waves in a silent duration (while the talker is not actually talking) and transmits electric waves only in a talkspurt (while the talker is actually talking). Supposing, for example, that the speech activity factor, i.e. talkspurt/(talkspurt+silent duration), is 50%, the use of the VOX system will reduce by half the power consumption as compared with that of radio communication equipment which conducts continuous transmission.

For the operation of the VOX system, however, it is necessary for the receiver to distinguish between the talkspurt and the silent duration. Several methods are available for this purpose, and in the present invention talkspurt starting information is added to the speech code prior to transmission as described below. That is, a portion of the speech code information is substituted with the talkspurt starting information. In this instance, if the speech code information of the speech frame in which the start of a talkspurt was detected is removed for replacement with the talkspurt starting information, then there will occur missing of talkspurt starting, which incurs deterioration of sound articulation and hence lowers the speech quality. In view of this, the following embodiments are adapted to avoid missing of talkspurt starting.

Figure 11:
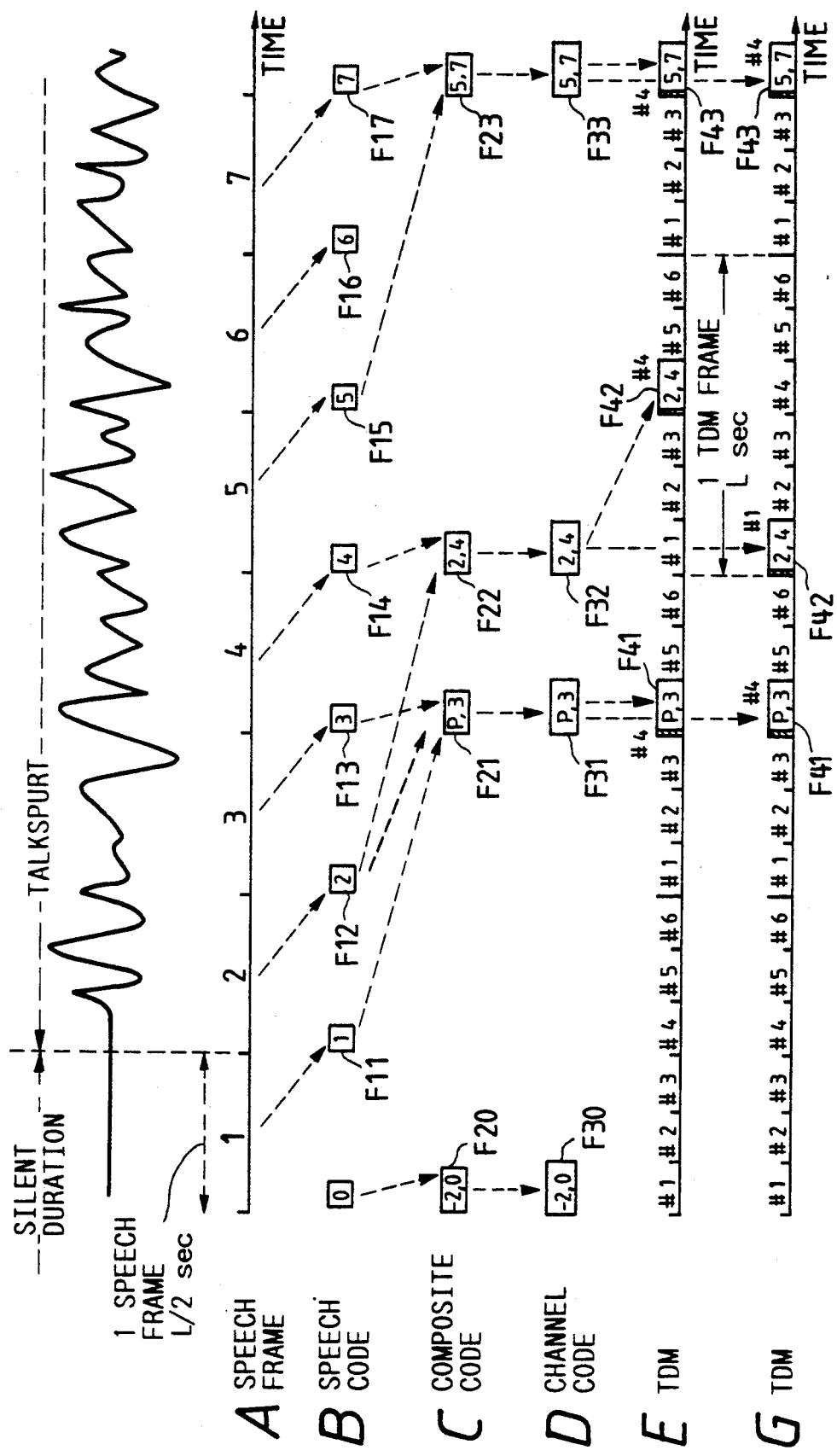
FIG. 11 is a timing chart showing the speech transmission procedure in a fifth embodiment of the present invention which includes the transmission of talkspurt starting information.

FIG. 11 illustrates another embodiment of the invention which is designed so that it transmits talkspurt starting information P in Embodiment 1 of FIG. 4. As will be seen from the waveform of the speech signal Sa shown above Row A, the talkspurt starts in the second speech frame in this example. It can be detected at the time of speech coding shown on Row B whether each speech frame is a talkspurt or silent duration. It is well-known in the art that when a pitch period is detected from the speech waveform in the speech frame in its speech coding, the speech frame can be decided to be a talkspurt. In the case where the start of a talkspurt is detected in the coding of the speech frame shown on Row B, the leading or foremost speech frame is removed in the composite code to be multiplexed in the TDM time slot for the first time after the detection and the talkspurt starting information P is incorporated in the code in place of the removed speech frame, then the composite code is inserted in the TDM time slot. In the example of FIG. 11 it is the composite code F21 that is to be sent out for the first time after the detection of the start of the talkspurt. Accordingly, the speech code F11 corresponding to the speech frame of a silent duration, which was to be incorporated in the composite code F21, is not incorporated but instead the talkspurt starting information P is incorporated in the code F21. Other processing is the same as in the embodiment of FIG. 4. Also in the case where the talkspurt starts in another speech frame, the same procedure as mentioned above is used. In this embodiment there will be no missing of talkspurt because the talkspurt starting information can be transmitted at the sacrifice of only speech coding information of the speech frame which is a silent duration. This principle is applicable to either of TDM slot assigning methods shown on Rows E and G, but in the method depicted on Row G no talkspurt starting information can be transmitted when the talkspurt starts in first, fifth, ninth, ... speech frames.

Figure 12:
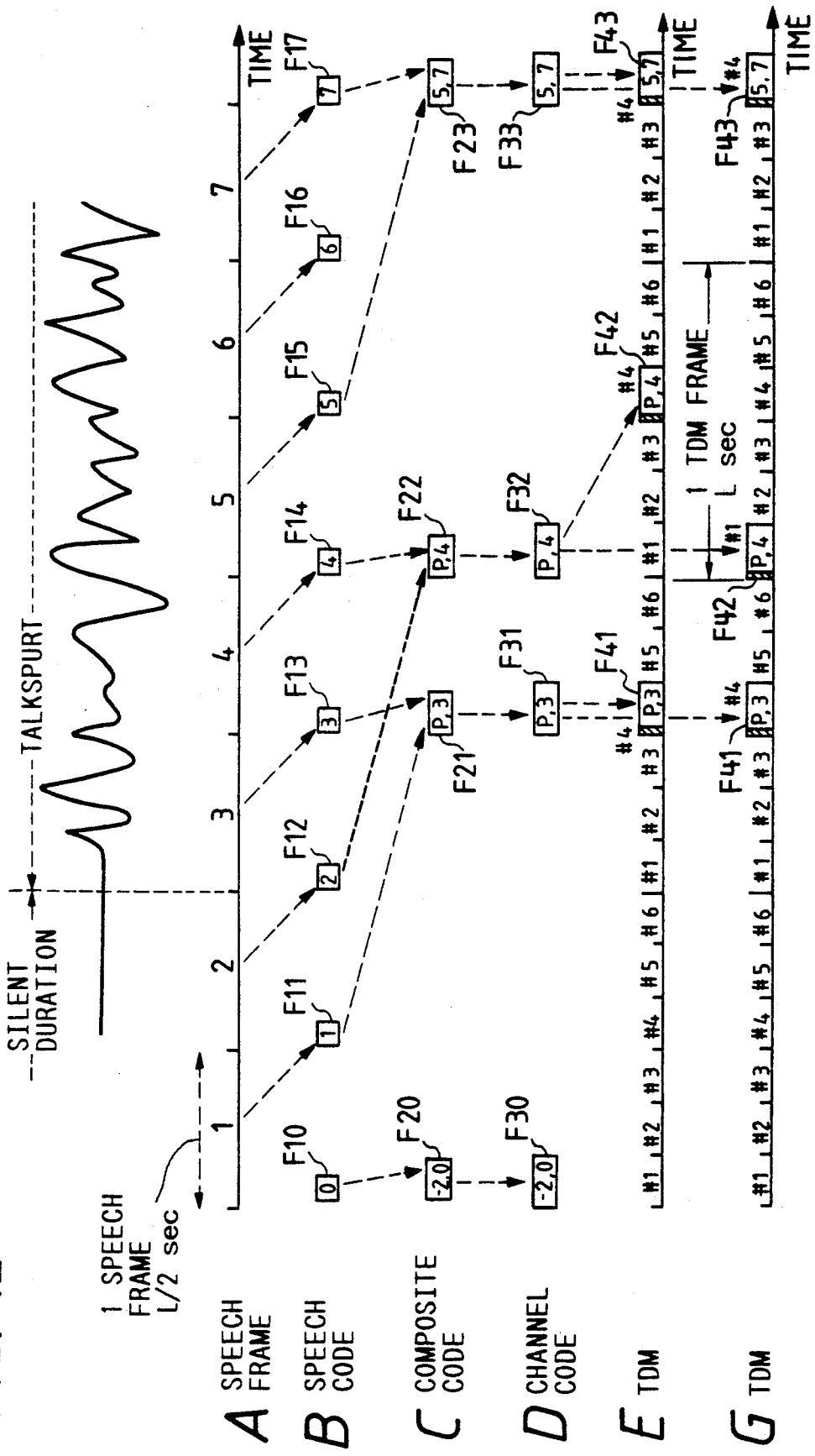
FIG. 12 is a timing chart showing the speech transmission procedure which is taken when a talkspurt starts in other speech frame.

FIG. 12 illustrates an example of processing in the case where the talkspurt starts at the third speech frame in the embodiment of FIG. 4. (The processing in this example is common to all the cases where the talkspurt starts at the seventh, eleventh, ... speech frames.) When the start of the talkspurt is detected during the coding of the third speech frame, the talkspurt starting information P is inserted in the composite code F21 as a substitute for the speech code F11 of the first speech frame as in the case of the embodiment of FIG. 11. Since missing of talkspurt starting can be avoided by starting transmission at the speech code F13 of the third speech frame, the following two processing methods are available for the transmission of the speech code F12 of the second speech frame.

A first method is one that does not insert the speech code F12 of the second speech frame in the composite code F22 but instead inserts again the talkspurt starting information P in the code F22 as shown on Row C. This method sends the talkspurt starting information P twice, and hence substantially enhances the reliability of the information P.

A second method is one that transmits the code F22 produced by combining the speech code F12 of the second speech frame with the speech code F14. With this method, the transmission of speech starts with the speech information one frame before the decision of talkspurt starting, producing the effect of suppressing the probability of missing of talkspurt starting when there is a prediction error in the algorithm for the decision of talkspurt.

EMBODIMENT 6

Figure 13:
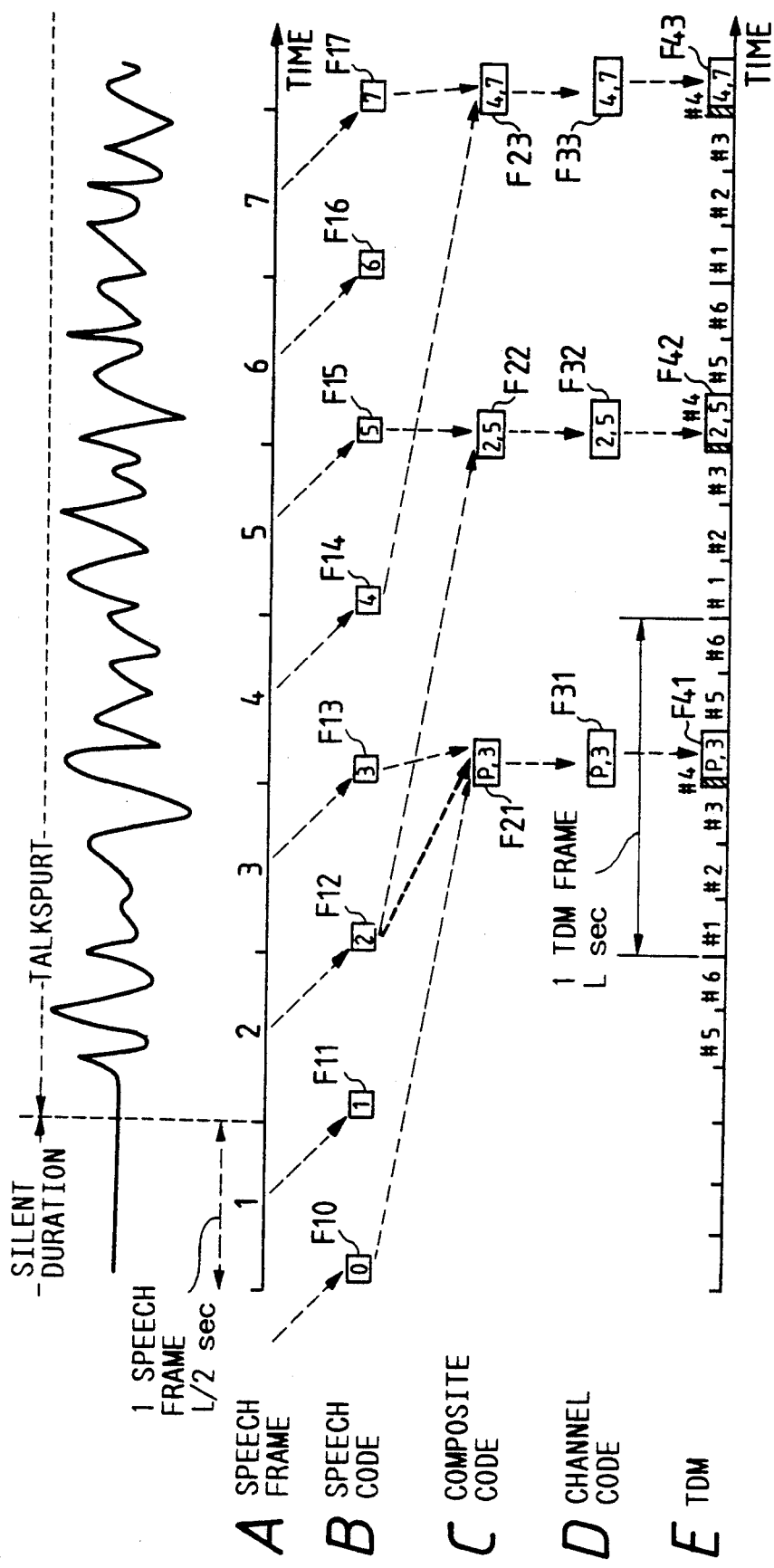
FIG. 13 is a timing chart showing the speech transmission procedure in a sixth embodiment of the present invention which includes the transmission of talkspurt starting information.

This embodiment is an example in which the method of transmission of the talkspurt starting information P described previously with respect to FIG. 11 is applied to Embodiment 2 of FIG. 7, and the procedure therefor is shown in FIG. 13. Also in this embodiment, when the start of talkspurt is detected, the speech code of the preceding speech frame, which is one of the two speech codes which are combined into the composite code to be sent out for the first time after the detection of the start of talkspurt, is replaced with the talkspurt starting information P. For example, in FIG. 13, it is the composite code F21 that is sent out for the first time after the detection of the start of talkspurt. The speech code F11 is removed which was initially intended to be incorporated in the composite code F21, and the talkspurt starting information P is incorporated in the composite code F21 as a substitute for the speech code F11. Other procedures are the same as those used in the embodiment of FIG. 11. In this embodiment there will be no missing of talkspurt starting, because the start information of talkspurt starting at the second speech frame can be transmitted at the sacrifice of only the speech code of the first speech frame.

Moreover, in the case where the talkspurt starts at the third speech frame (also in the cases where it starts at fifth, seventh, ninth, ... speech frames), the speech code F12 of the second speech frame which is a silent duration is incorporated in the next composite code F22; alternatively, the talkspurt starting information P may be incorporated in place of the speech code F12.

It is evident that the method of transmission of the talkspurt starting information P, described previously in respect of FIG. 11, can be similarly applied to the embodiments of FIGS. 8 and 9. That is, when the start of the talkspurt is detected in a certain speech frame, the talkspurt starting information P is substituted for at least one speech code preceding the speech frame in which the start of talkspurt was detected, the at least one speech code being one of the speech codes to be incorporated in the composite code shown on Row C which is sent out for the first time after the detection of the start of talkspurt. For example, in the case of FIG. 8, when the talkspurt starts in the second or third or fourth speech frame, the talkspurt starting information P is incorporated in place of the speech code F10, or F10 and/or F12, or F10 and/or F12 among the speech codes F10, F12 and F14 to be incorporated in the composite code F21. The same is true of the case of FIG. 9. As described previously in respect of FIG. 12, it is also possible to replace the talkspurt starting information P for the speech code (F13 in FIG. 8 and F15 in FIG. 9) of the speech frame preceding that (for example, the fourth speech frame in FIG. 8 and the fifth speech frame in FIG. 9) in which the start of talkspurt was detected, the above-mentioned speech code being one that is incorporated in the composite code (for example, F22) which is produced after the transmission of the composite code (F11, for instance) having incorporated therein the talkspurt starting information P in FIGS. 8 and 9.

As described above, according to the present invention, since speech codes of a plurality of speech frames spaced one or more speech frames apart are inserted in a combined form in one time slot in each TDM frame, the probability of causing errors in the speech codes of contiguous frames by a channel error is low. This ensures a high probability that the speech code or speech waveform, in which an error has been caused, can be interpolated using the speech code or speech waveform of the adjoining frame. Besides, since the speech frame length is selected equal to or shorter than the period in which the speech waveform remains substantially steady-state, deterioration of the speech quality by interpolation is very slight.

In the case where the error detecting function as by error correcting coding is provided in a part of information in each time slot, information bits to be checked for an error are packed as one lump package at the beginning or end of the time slot. This increases the probability of escaping from a burst error on the channel.

In the case where alternate speech frames are selected in pairs without repetition and their speech codes are combined, the required transmission delay time can be reduced particularly short by inserting the composite codes in first and second different time slots alternately every TDM or TDMA frame.

In the case of incorporating in the channel code the information representing the start of talkspurt of a speech, that one of the speech codes to be inserted in the TDM or TDMA time slot at the next timing which is of the temporally foremost speech frame is removed and the talkspurt starting information is incorporated in the channel code in place of the thus removed speech code. The use of this method in speech transmission permits speech decoding free from the missing of talkspurt starting.

It will be apparent that many modifications and variations may be effected without departing from the scope of the novel concepts of the present invention.

What is claimed is:

1. A speech transmission method comprising
   a speech coding step of obtaining a sequence of speech codes by sequentially coding speech signals every speech frame which has a length 1/M of the period of a TDM or TDMA frame formed by a fixed number of time slots, the length of said speech frame being in the range of 0.6 to 50 ms;
   a code combining step of sequentially producing composite codes by combining in each of said composite codes, M individual speech codes selected from said speech code sequence, said M speech codes being so selected that every two speech codes are spaced at least one speech frame apart in said speech code sequence, M being an integer equal to or greater than 2; and
   a multiplexing step of sequentially inserting each composite code in one slot in each of said TDM or TDMA time slots for transmission.

2. The method of claim 1 wherein, in said code combining step, the speech code immediately preceding, in said speech code sequence, the last one of said M speech codes forming each of said composite codes, is included in the M speech codes forming the next one of said composite codes, and the leading one and the next speech codes of the M speech codes forming each of said composite codes are spaced at least N speech frames apart in said speech code sequence, N being an integer equal to or greater than 1.

3. The method of claim 2 wherein said M and said N are 2 and 1, respectively.

4. The method of claim 3 wherein said multiplexing step includes a step of inserting said composite codes in two different time slots, that are old-numbered and even-numbered respectively, of said TDM or TDMA frames.

5. The method of claim 1, 2, or 4 which further includes a decoding step of receiving said transmitted composite codes, reproducing therefrom said speech codes and decoding a speech from said reproduced speech codes, said decoding step including a step wherein the speech frame of a reproduced speech code in which a channel error remains uncorrected is subjected to fore-interpolation based on the reproduced speech code of the immediately preceding speech frame.

6. The method of claim 5 wherein said decoding step includes a step wherein when a channel error remains uncorrected in the reproduced speech code of the speech frame next to said speech frame subjected to said fore interpolation, said next speech frame is interpolated on the basis of said speech frame subjected to fore interpolation.

7. The method of claim 1, 2, or 4 which further includes a decoding step of receiving said transmitted composite codes, reproducing therefrom said speech codes and decoding a speech from said reproduced speech codes, said decoding step including a step wherein the speech frame of a reproduced speech code in which a channel error remains uncorrected is subjected to fore- and aft-interpolation based on the reproduced speech codes of the immediately preceding and succeeding speech frames.

8. The method of claim 1, 2 or 4 which further includes a decoding step of receiving said transmitted composite codes, reproducing therefrom said speech codes and decoding a speech from said reproduced speech codes, said decoding step includes a step wherein the speech frame of a reproduced speech code in which a channel error remains uncorrected is subjected selectively to fore-interpolation and fore- and aft-interpolation in accordance with the order number of said speech frame.

9. The method of claim 1 or 2 wherein said code combining step includes a step of detecting whether or not a talkspurt of a speech signal has started in a speech frame and a step wherein when the start of said talkspurt is detected, the composite code to be sent out after the detection of the start of said talkspurt is produced by substituting information indicating the start of talkspurt for a speech code of at least one of the speech frames preceding said speech frame in which the start of said talkspurt was detected, said speech code of said at least one of said preceding speech frames being one of said M speech codes initially intended to be incorporated in said composite code to be sent out for the first time after the detection of the start of said talkspurt.

10. The method of claim 9 wherein when the M speech codes which are to be incorporated in a composite code next to said composite code having incorporated therein said talkspurt starting information, include a speech code of another speech frame preceding said speech frame in which the start of said talkspurt was detected, said speech code of said another speech frame is replaced with said talkspurt starting information in the production of said next composite code.

11. The method of claim 1 or 2 wherein said multiplexing step includes a step of adding an error correction code and an error detection code to each composite code to be inserted in one slot in each of said TDM or TDMA frames.

12. The method of claim 11 which further includes a step wherein information bits to be checked for an error in said each composite code are packed as one lump package at the head or end of each of said time slots.

* * * * *